United States Patent
Suh et al.

(10) Patent No.: US 7,729,720 B2
(45) Date of Patent: Jun. 1, 2010

(54) EMBEDDED CAMERA APPARATUS AND MOBILE PHONE INCLUDING THE SAME

(75) Inventors: Jae-gyeong Suh, Changwon-si (KR); Sam-gi Park, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 1264 days.

(21) Appl. No.: 11/005,094

(22) Filed: Dec. 6, 2004

(65) Prior Publication Data

US 2006/0044442 A1    Mar. 2, 2006

(30) Foreign Application Priority Data

Aug. 28, 2004 (KR) ............. 10-2004-0068287

(51) Int. Cl.
*H04B 1/38* (2006.01)
*H04M 1/00* (2006.01)
*H04Q 7/20* (2006.01)

(52) U.S. Cl. ........... 455/550.1; 455/575.1; 455/90.3; 455/556.1

(58) Field of Classification Search ......... 455/575.1, 455/90.1, 550.1, 575.2, 575.03, 575.04, 556.1, 455/557, 97, 575, 90.3; 379/433.06, 433.97
See application file for complete search history.

(56) References Cited

U.S. PATENT DOCUMENTS

| | | | | |
|---|---|---|---|---|
| 5,711,013 | A * | 1/1998 | Collett et al. | 455/558 |
| 6,287,021 | B1 * | 9/2001 | Katoh et al. | 396/348 |
| 6,879,337 | B2 * | 4/2005 | Tatehana et al. | 348/14.02 |
| 6,882,726 | B2 * | 4/2005 | Kim | 379/433.13 |
| 7,046,287 | B2 * | 5/2006 | Nishino et al. | 348/333.06 |
| 7,184,803 | B2 * | 2/2007 | Wu | 455/575.1 |
| 7,193,653 | B2 * | 3/2007 | Lee | 348/373 |
| 7,242,975 | B2 * | 7/2007 | Bae et al. | 455/575.3 |
| 7,269,255 | B2 * | 9/2007 | Satoh et al. | 379/428.01 |
| 7,269,442 | B2 * | 9/2007 | Sato et al. | 455/556.1 |
| 7,272,423 | B2 * | 9/2007 | Satoh et al. | 455/575.3 |
| 7,423,689 | B2 * | 9/2008 | Kim et al. | 348/374 |
| 7,650,171 | B2 * | 1/2010 | Hamamura et al. | 455/575.1 |
| 7,653,420 | B2 * | 1/2010 | Hamamura et al. | 455/575.1 |
| 7,660,613 | B2 * | 2/2010 | Hamamura et al. | 455/575.1 |
| 2002/0142810 | A1 * | 10/2002 | Kawasaki et al. | 455/566 |
| 2003/0184880 | A1 | 10/2003 | Kawanabe | |
| 2004/0023684 | A1 * | 2/2004 | Sato et al. | 455/550.1 |
| 2004/0095500 | A1 * | 5/2004 | Sato et al. | 348/340 |
| 2004/0132491 | A1 * | 7/2004 | Kim et al. | 455/556.1 |
| 2004/0212702 | A1 * | 10/2004 | Suh | 348/240.99 |
| 2005/0026659 | A1 * | 2/2005 | Yang | 455/575.3 |

(Continued)

FOREIGN PATENT DOCUMENTS

| | | |
|---|---|---|
| CN | 1404284 A | 3/2003 |
| CN | 1501666 A | 6/2004 |
| EP | 1 422 931 A1 | 5/2004 |
| EP | 1 324 594 A3 | 1/2005 |
| JP | 2004-297660 A | 10/2004 |
| WO | WO 99/07139 A1 | 2/1999 |

*Primary Examiner*—Tilahun Gesesse
(74) *Attorney, Agent, or Firm*—Drinker Biddle & Reath LLP

(57) ABSTRACT

A mobile phone including an embedded camera apparatus having a camera module that is projectable from a main body of the mobile phone and a flexible circuit board that provides a stable electrical connection between the camera module and a main board when the camera module is projected from or inserted in the main body of mobile phone.

20 Claims, 6 Drawing Sheets

U.S. PATENT DOCUMENTS

2005/0239520 A1* 10/2005 Stefansen ................ 455/575.1
2007/0032202 A1* 2/2007 Hamamura et al. ......... 455/90.1
2007/0032203 A1* 2/2007 Hamamura et al. ......... 455/90.1
2007/0032204 A1* 2/2007 Hamamura et al. ......... 455/90.1
2007/0032205 A1* 2/2007 Hamamura et al. ......... 455/90.1

* cited by examiner

FORWARD ← → BACKWARD

FORWARD ← → BACKWARD

EMBEDDED CAMERA APPARATUS AND MOBILE PHONE INCLUDING THE SAME

This application claims the priority of Korean Patent Application No. 2004-68287, filed on Aug. 28, 2004, in the Korean Intellectual Property Office, the disclosure of which is incorporated herein in its entirety by reference.

BACKGROUND OF THE INVENTION

1. Field of the Invention

The present invention relates to an embedded camera apparatus and a mobile phone including the same, and more particularly, to an embedded camera apparatus and a mobile phone including the same, wherein the camera apparatus can be projected from and inserted in a case and can photograph a subject when it is projected outside of the case.

2. Description of the Related Art

As data transmission rates increase, the size of LCDs decrease, and electronic circuits become increasingly integrated, mobile phones increasingly can transmit pictures as well as voice.

Conventional folder-type mobile phones are typically composed of a main body housing and a folder, with a hinge unit formed between the main body housing and the folder. The hinge unit typically comprises a main body connector and a folder connector which are rotatably interconnected by a hinge-connecting structure. Moreover, some conventional folder-type mobile phones include a camera module which is capable of rotating 180° for focusing a subject for photographing, and which is mounted to the main body connector or to the folder connector of the hinge unit.

With typical mobile phones, a portion of the camera module must protrude a predetermined amount, in order for a user of the mobile phone to adjust the rotation angle of the camera module to an angle desired by a user. Such a protrusion of a camera module detracts from the goal of producing flat- and small-sized mobile phones. Moreover, protrusion of a camera module from a mobile phone can make the camera module more susceptible to damage from an impact, for example, if the mobile phone is dropped by a careless user. Protrusion of a camera module from a mobile phone also requires a complicated shape and design and detracts from the appearance of the phone, which has the potential to lead to consumer dissatisfaction with the phone.

SUMMARY OF THE INVENTION

The present invention provides an embedded camera apparatus and a mobile phone including the same, having a flexible printed circuit board that electrically connects a camera module capable of being projected from a case, such as a main body of a mobile phone, to a main board of a mobile phone, when the camera module is projected from or inserted in the case.

According to an aspect of the present invention, there is provided an embedded camera apparatus comprising a module housing, a flexible circuit board, and a guide member. The module housing embeds a camera module that includes an image pick-up device and a lens, and is stored in a case so that at least a part of the module housing can be projected. The flexible circuit board electrically connects the camera module and an external main board. The guide member, which is formed in the case, can comprise a guide axis which is projectable inside the module housing, and which guides the flexible circuit board, such that the flexible circuit board is arranged along the guide axis when the module housing is projected from or stored in the case.

The module housing comprises a module storage unit and a salience insertion unit. The module storage unit, in this regard, stores the camera module. The salience insertion unit is a hollow cylinder shape, which is insertable into the case and projectable from the case. The guide member comprises a combination plate which is connected to the case along a salience axis of the camera module. The guide axis is projectable into the salience insertion unit from the combination plate. The flexible circuit board can form an S-shape along one side of (i.e., adjacent to) the guide axis inside the salience insertion unit.

The flexible circuit board may comprise a module side part which is connected to one end of the camera module, and which is adjacent to one side of the guide axis; a main board side part which is connected at one end to the external main board, and which is adjacent to the opposing side of the guide axis; and a connection part which connects the module side part and the main board side part, and which is adjacent to the module side part along the one side of the guide axis.

The salience insertion unit can comprise one or more salience units at a portion of the salience insertion unit which confronts the combination plate. Moreover, the combination plate can comprise an insertion hole into which the one or more salience units are insertable, such that the one or more salience units are moveable back and forth and rotatable with the insertion hole when inserted in the insertion hole In another embodiment of the present invention, a mobile phone is provided, which comprises an embedded camera apparatus comprises a main body, a module housing, a flexible circuit board, and a guide member. The main body can comprise a main body case unit that embeds a main board. The module housing that embeds a camera module can comprise an image pick-up device and a lens, and can be stored in the main body of mobile phone, such that at least a part of the module housing is projectable. The flexible circuit board electrically connects the main board and the camera module. The guide member can comprise a guide axis which projects inside the module housing, and which guides the flexible circuit board, such that flexible circuit board is formed along the guide axis when the module housing is projected from or stored in the main body of the mobile phone.

The module housing can comprise a module storage unit which stores the camera module, and a salience insertion unit which has a hollow cylinder shape and which is insertable into the main body and projectable from the main body of the mobile phone. Moreover, the main body can further comprise a folder unit that is hinge-combined with the main body case unit by a hinge unit which forms the module housing.

Several benefits accompany the mobile phone of the present invention. For example, the mobile phone can be made flat, can be stored in a variety of square-type mobile phone storage means, and can have a good appearance. Additionally, a stable electrical connection is maintained between the camera apparatus and the main board of mobile phone, even when the camera apparatus is protruded from the mobile phone.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings.

Figure 1:
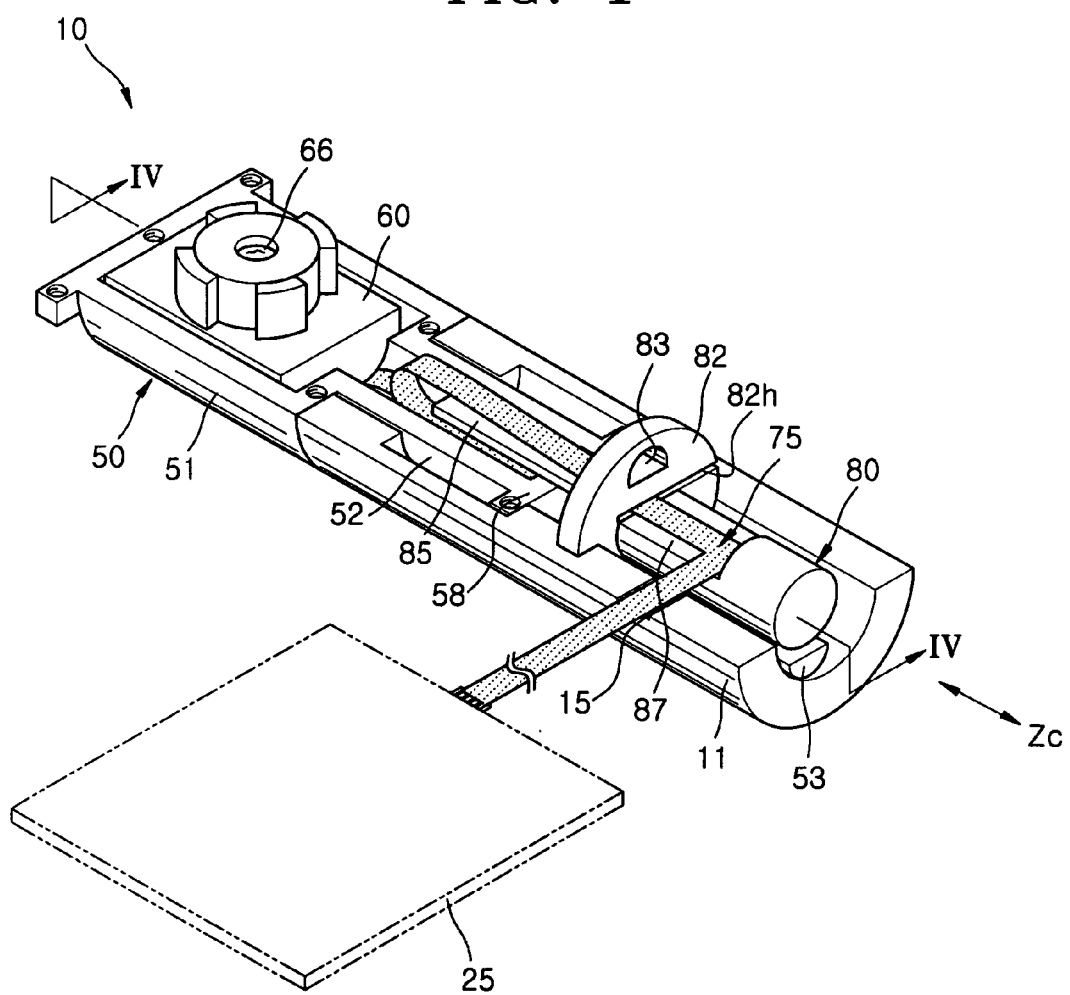
FIG. 1 is a perspective view illustrating a lower part of an embedded camera apparatus according to an embodiment of the present invention.
Figure 2:
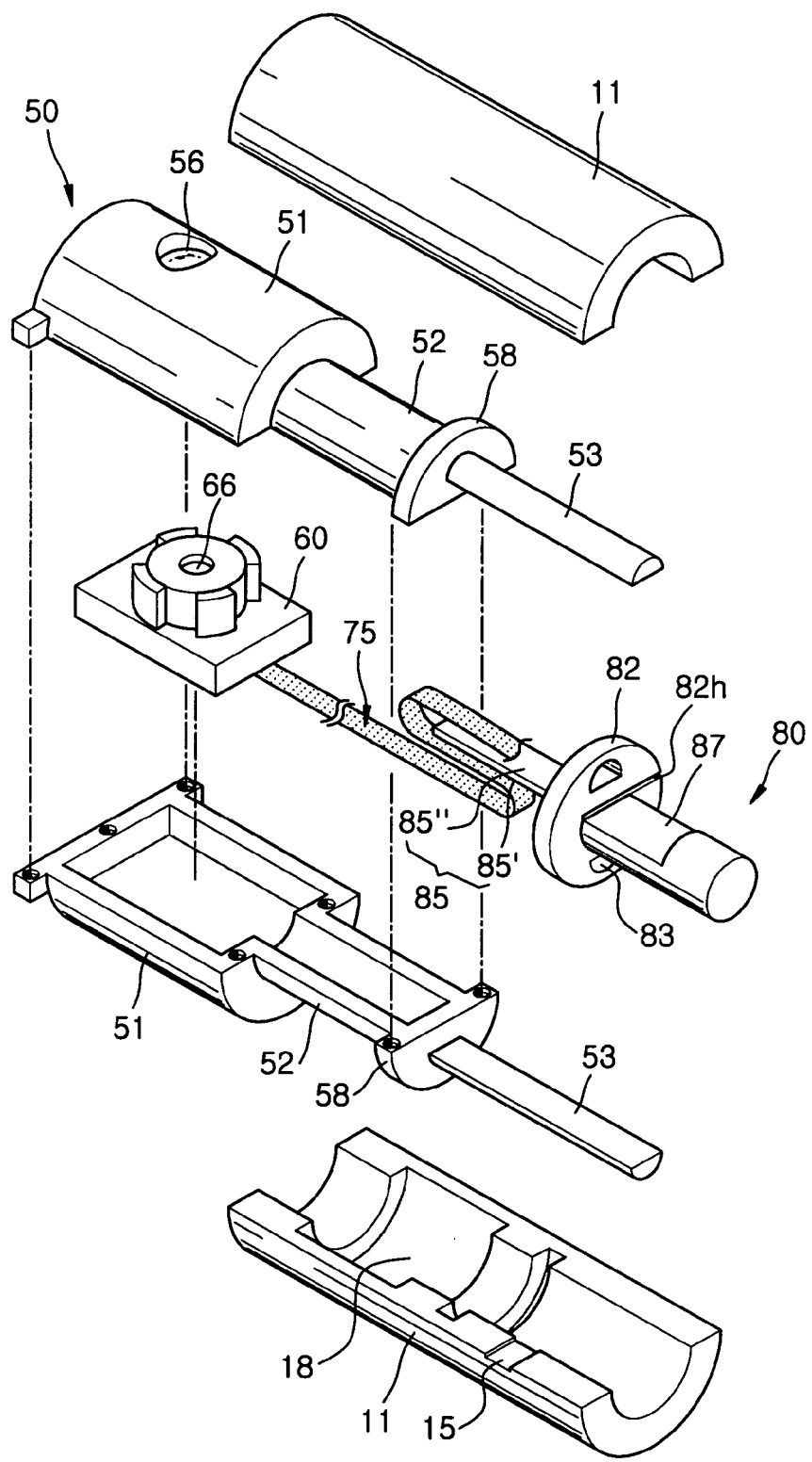
FIG. 2 is an exploded view illustrating the lower part of the embedded camera apparatus according to an embodiment of the present invention.

In one embodiment of the present invention, as depicted in FIGS. 1 and 2, an embedded camera apparatus 10 comprises a module housing 50, a flexible printed circuit board 75, and a guide member 80. The embedded camera apparatus 10 can be embedded in an external apparatus that receives an electrical image signal for realizing, editing, or outputting an image. The module housing 50 embeds a camera module 60 and can be stored in and/or projected from a case 11, which can have a hollow shape. The camera module 60, in this regard, can include an image pick-up device (not shown), such as a CCD or a CMOS, and a lens 66. The case 11 can be part of the embedded camera apparatus 10, or can be part of (i.e., formed in) a portion of the main body of an external apparatus, such as, for example, a mobile phone or PDA. In other words, the case 11 can be included in the embedded camera apparatus 10, which, in turn, is mounted in an external apparatus. Moreover, an embedded camera apparatus 10 can be mounted in a case 11 which forms a part of an external apparatus.

The camera module 60 of the embedded camera apparatus 10 can be electrically connected to an external main board 25 of an external apparatus. In this regard, an image signal that is converted through a lens 66 and an image pick-up device can be transferred to the external main board via a flexible printed circuit board (FPCB) 75. A through-hole 15 can be formed on one side of the case 11 so that the flexible printed circuit board 75 can pass through the embedded camera apparatus 10 to connect with the external main board 25.

It is preferable that the embedded camera apparatus 10 needs only be projected from an external apparatus when photographing a subject. In this regard, an embedded camera apparatus 10 which is projected from an external apparatus is more susceptible to collisions with objects, which can result in damaging to the embedded camera apparatus 10. Moreover, an external apparatus that embeds an embedded camera apparatus 10 can be dropped to the ground, wherein the impact energy can be focused on an embedded camera apparatus 10 projected from the external apparatus, resulting in damaging the embedded camera apparatus 10.

The flexible printed circuit board 75 can be any length suitable for both storing the module housing 50 in the case 11 and for projecting the module housing 50 outside the case 11. It is preferable, in this regard, for the flexible printed circuit board 75 to be sufficiently long to electrically connect the camera module 60 and the external main board 25 without tension, for example, when the module housing 50 is projected from the case 11 and the length from the camera module 60 to the external main board 25 is increased.

It is also preferred that the flexible printed circuit board 75 remains untwisted in the module housing 50 when module housing is rotated. In an embodiment of the present invention, the embedded camera apparatus comprises a guide member 80 that prevents the flexible printed circuit board (FPCB) 75 from being twisted. The guide member 80, in this regard, includes a guide axis 85 which is projected inside the module housing 50, and which guides the FPCB, such that the FPCB is arranged along the guide axis. In other words, when the module housing 50 is projected from or stored in the case 11, the flexible printed circuit board 75 is formed along the guide axis 85.

The camera module 60 can be protected when not is use by inserting and storing the camera module in the case 11. In an embodiment of the present invention, the module housing 50 includes a module storage unit 51 which stores the camera module 60 and a salience insertion unit 52. Preferably, the salience insertion unit 52, in this regard, has a hollow cylindrical shape and is insertable into and projectable from the case 11.

The guide member 80 also preferably comprises a combination plate 82 having a disc shape and a guide axis 85 which is perpendicularly centered to the combination plate and which is shaped such that it projects into the salience insertion unit 52. The combination plate 82, in this regard, is preferably connected to the case 11 along the Zc protrusion axis of the camera module 60. In other words, the combination plate 82 can be fixed along the Zc salience axis, as well as being rotable in a perpendicular manner with respect to the Zc salience axis.

Figure 3:
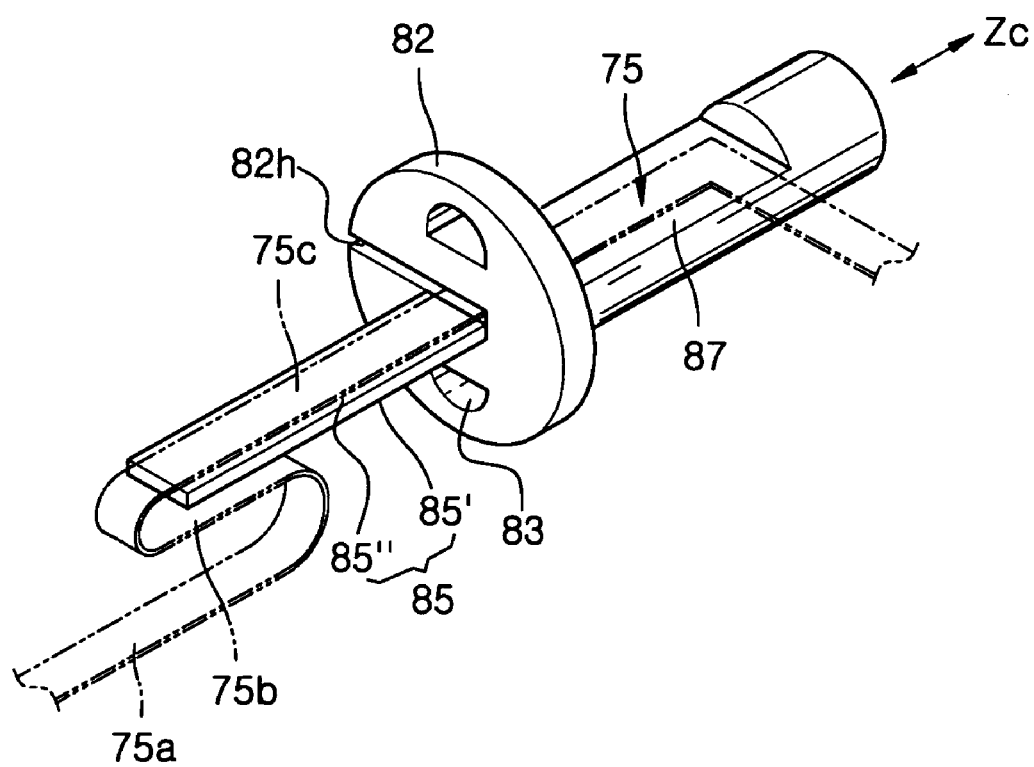
FIG. 3 is a perspective view illustrating a flexible printed circuit board that is inserted in an insertion groove of a guide member as shown in FIG. 2.

As shown in FIG. 3, the flexible printed circuit board (FPCB) 75 can form an S-shape along (i.e., adjacent to) one side 85' of the guide axis 85 inside the salience insertion unit 52, thereby preventing the flexible printed circuit board from being twisted.

The flexible circuit board 75 can include a module side part 75a, a main board side part 75c, and a connection part 75b. Preferably, the module side 75a is connected to one end of the camera module 60 and is adjacent to one side 85' of the guide axis. The main board side part 75c is preferably connected at one end to the external main board 25 (see FIG. 1) and is adjacent to the other side 85" of the guide axis. The connection part 75b connects the module side part 75a and the main board side part 75c and preferably is adjacent to the side 85' of the guide axis and adjacent to the module side unit. In other words, the module side part 75a, the main board side part 75c, and the connection part 75b can collectively form an S-shape.

Figure 4A:
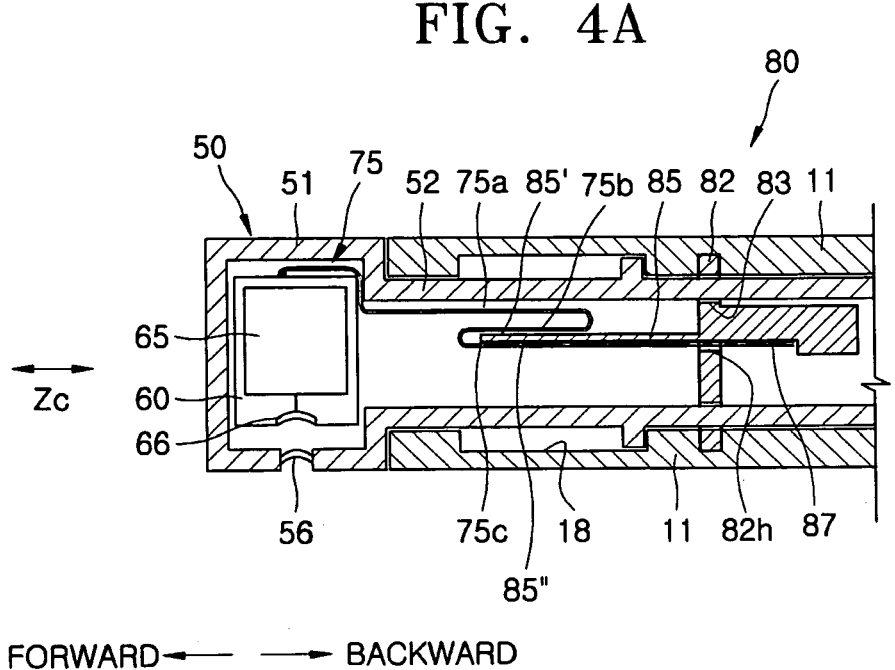
FIGS. 4A and 4B are sectional views taken along the IV-IV line of FIG. 1.
Figure 4B:
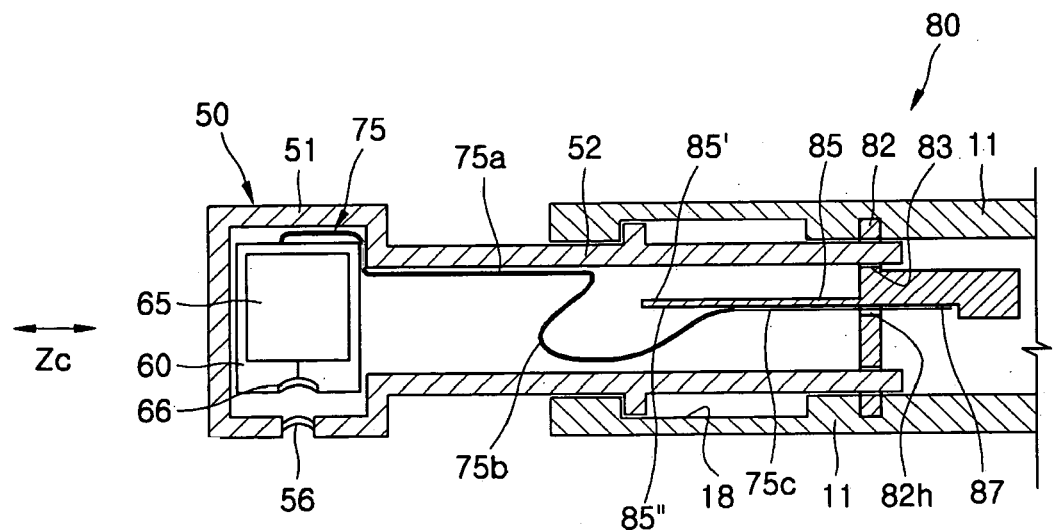

As shown in FIG. 4A, when the module housing 50 is in a stored position in the case 11, the module side part 75a, the connection part 75b, and the main board side part 75c are positioned inside the module housing 50, such that the flexible circuit board has an S-shape. When the module housing 50 is in a protruded position outside the case 11, however, as shown in FIG. 4B, the flexible circuit board 75 is untwisted and the length of the connection part 75b along the salience axis is decreased, such that the module side part 75a, the main board side part 75c, and the connection part 75b have a tilted S-shape.

The combination plate 82, as shown in FIGS. 1 and 2, can include an insertion groove 82h into which the main board side part 75c is inserted. The insertion groove 82h, in this regard, preferably decreases or eliminates up and down movement of the main board side part 75c of the flexible circuit board 75, thereby preventing the flexible circuit board from being twisted, and simultaneously preventing the main board side part 75c from moving back and forth. In this manner, a stable electrical connection between the external main board 25 and the camera module 60 can be maintained.

The flexible circuit board 75 between the module housing 50 and the external main board 25 can be any suitable shape and length. Preferably, the flexible circuit board 75 has a suitable shape and length to avoid those excessive forces that are inflicted on a terminal connecting to the external main board 25, for example, when the module housing 50 is projected from or inserted in the case 11 and the flexible printed circuit board 75 placed outside the module housing 50 moves, which otherwise would result the absence of a smooth connection between the flexible circuit board 75 and the external main board 25. In order to prevent such disconnection, the main board side part 75c, for example, can be inserted into the insertion groove 82h to be substantially fixed thereto, such that the electrical connection between the flexible circuit board 75 and the external main board 25 is stable.

Any suitable mechanism can be employed to prevent the flexible circuit board 75 from twisting. For example, the module housing 50 can be capable of rotating in the same manner as the guide member 80 (discussed above). Additionally, the camera module 60 can be rotatably formed. Moreover, the guide axis 85 can be rotated in the same manner as the camera module 60, in order to prevent the flexible circuit board 80 from being twisted.

In another preferred embodiment of the present invention, the combination plate comprises a board placement unit 87 to prevent the flexible circuit board 75 from twisting and to ensure a stable electrical connection between the flexible circuit board 75 and the external main board 25, wherein the board placement unit 87 projects in a direction opposite of the salience insertion unit, which situates (i.e., guides or positions) at least a part of the main board side part 75c, and which protrudes from the combination plate 82. In this regard, the insertion groove 82h preferably is substantially parallel or parallel with the guide axis 85, and the board placement unit 87 is substantially adjacent in location to insertion groove 82h.

The combination plate 82 is preferably fixed to the case adjacent to the salience Z axis, and is not fixed adjacent to the perpendicular direction of the salience axis, so as to make its rotation possible. Moreover, it is preferable for one or more insertion holes 83 to be formed at the combination plate 82, and a salience unit 53, which is inserted in the insertion hole 83, to be formed at an end of the salience insertion unit 52 which confronts the insertion hole 83, such that the salience unit 53 is inserted in the insertion hole 83.

It is preferable, in an embodiment of the present invention, for the guide member 80 to be fixed in location during movement of the module housing 50 into and out of the case 11. In other words, the module housing 50 can be moveable, while the guide member 80 is fixed. Moreover, it is preferable that when the module housing 50 rotates, the salience unit 53 is inserted in the side of the insertion hole 82h, such that the module housing 50 and the guide member 80 rotate together. As such, when the module housing 50 rotates, the guide member 80 rotates with the module housing 50, and the flexible circuit board 75 is inserted in the insertion groove 82h of the guide member 80 and is fixed thereto. Accordingly, because the module housing 50 also rotates, the flexible circuit board 75 is prevented from being twisted. In another embodiment of the present invention, a rotation range guide apparatus (not shown) may be formed at the module housing 50 and the case 11, so that the module housing 50 cannot be rotated more than a predetermined angle, e.g., 180°.

The module housing 50 can be projected from or inserted into the case 11, for example, by pressure applied by a user. To be more specific, a salience 58 is formed on the circumferential surface of the salience insertion unit 52 of the module housing 50, and the salience 58 is inserted into a salience guide groove 18 on the inside surface of the case 11 that confronts the salience, and which guides forward and backward movement of the salience 58. Accordingly, when a user pulls or pushes the module storage unit 51 of the module housing toward the salience axis Zc, the salience 58 moves back and forth along the salience guide groove 18 to make the module housing project from or insert into the case 11.

Figure 5:
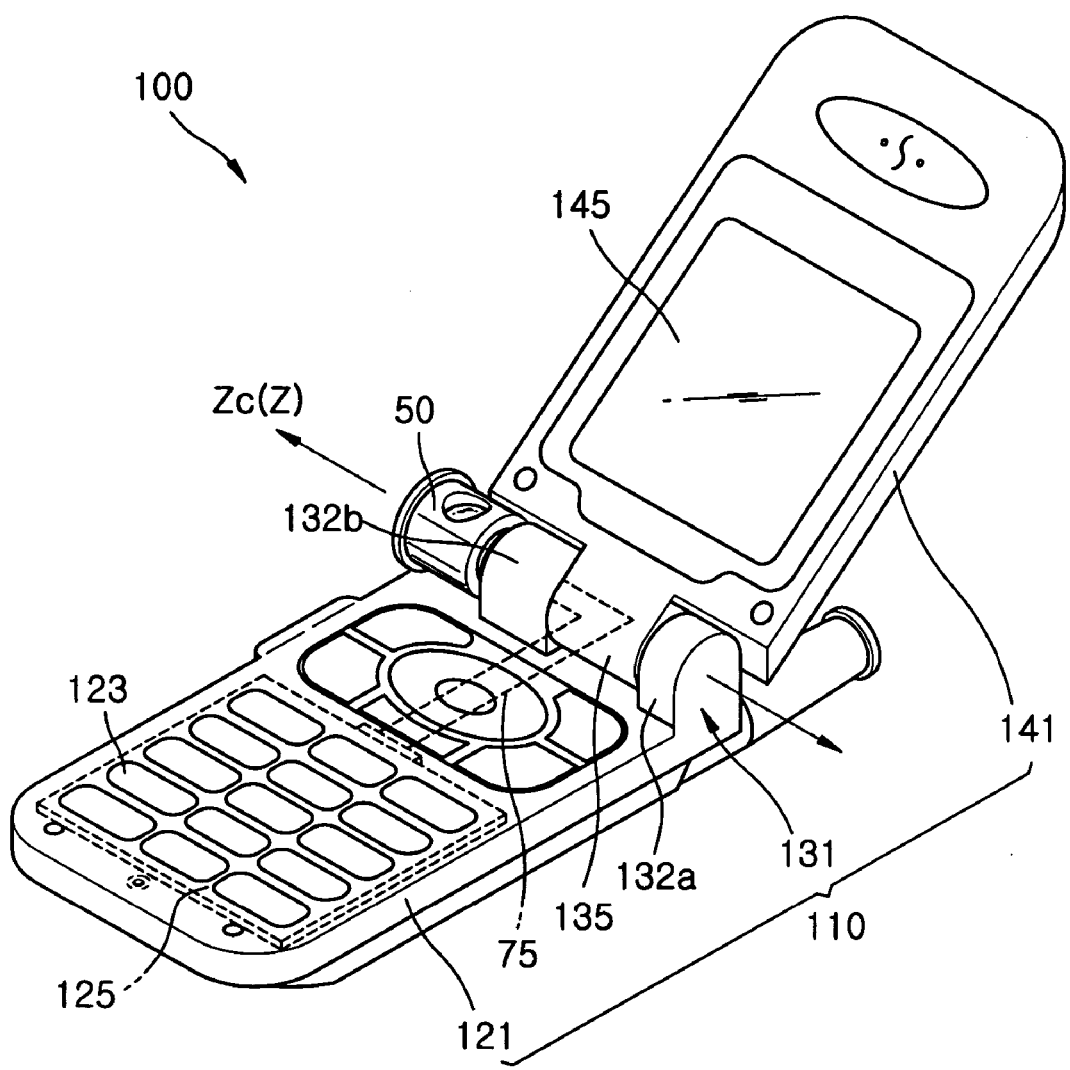
FIG. 5 is a perspective view illustrating a mobile phone according to an embodiment of the present invention.
Figure 6:
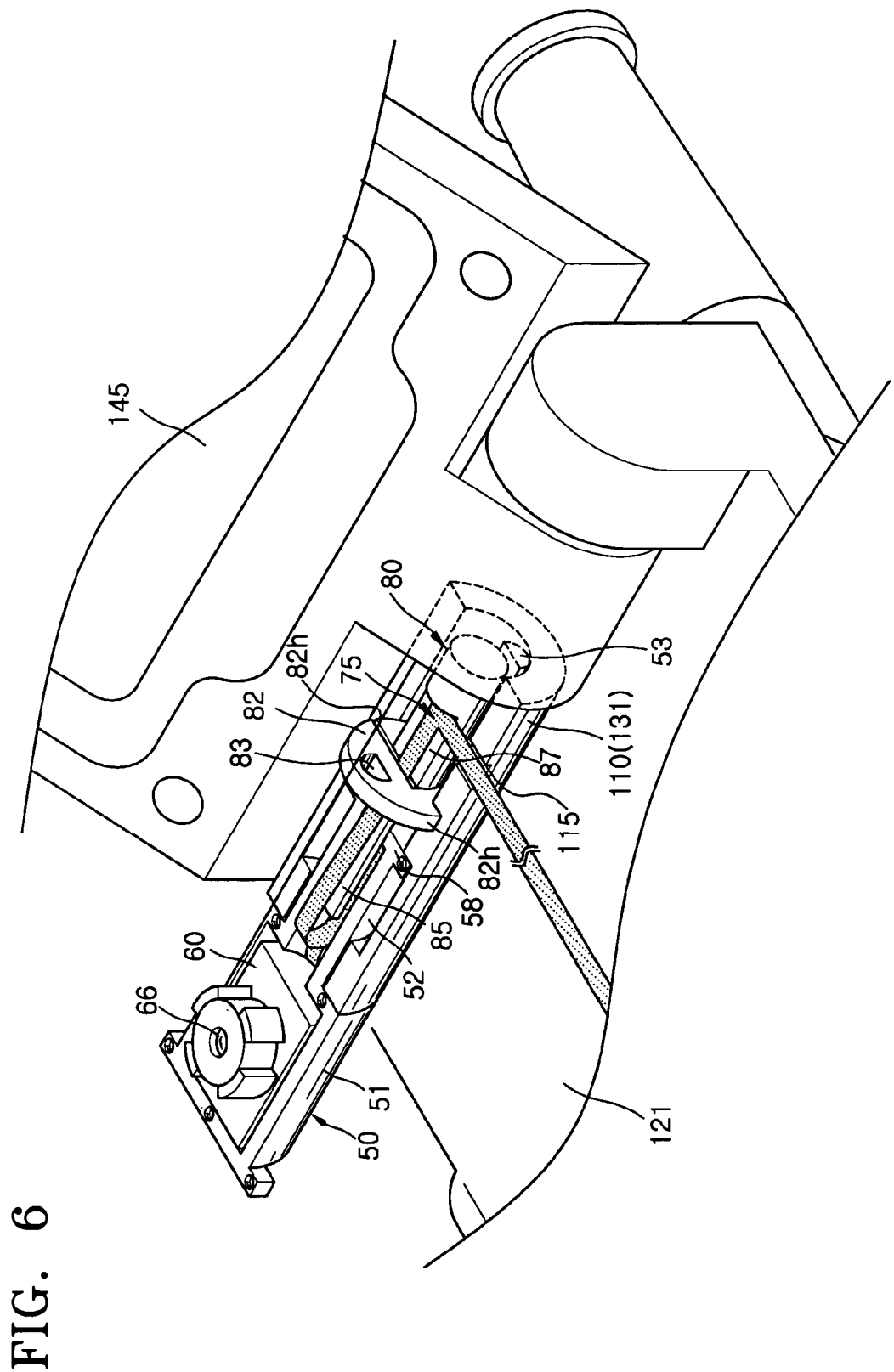
FIG. 6 is a perspective view illustrating the mobile phone of FIG. 5 with an embedded camera apparatus.

Another embodiment of the present inventions provides a mobile phone 100 comprising the embedded camera apparatus, as illustrated in FIG. 5. Referring to FIGS. 5 and 6, the mobile phone 100 comprises a main body 110, a module housing 50, a flexible circuit board 75, and a guide member 80. The main body 110 can comprise a main body case unit 121, which embeds a main board 125 having a plurality of key buttons 123 on the front. The plurality of key buttons 123 include character keys, number keys, a delete key, an end key, and special function keys. The main body 125 can further comprise a folder unit 141, having a display window 145 such as an LCD, an OLED, etc. which shows an image such as a telephone number, a character, and motion picture, etc. thereon.

The folder unit 141 and the main body case unit 121 can be hinge-combined by a hinge unit 131. In particular, first and second side hinge arms 132a and 132b which are spaced from and opposite to each other can be formed on one side of the main body case unit 121. Moreover, a guide arm 135 inserted between the first and second side hinge arms 132a and 132b can be arranged on the folder unit 141. The first and second side hinge arms 132a and 132b, and the guide arm 135, in this regard, can be hinge-connected around a hinge axis Z, such that the folder unit 41 can be opened and closed with respect to the main body case unit 121 around the hinge axis Z. The module housing 50 can be stored in the main body 110.

FIG. 5 illustrates an example mobile phone 100 having the structure described above, as shown in FIG. 5. As depicted in FIG. 5, at least a part of the module housing 50 is stored in the second side hinge arm 132b so as to be projected on the outside of the main body 110. The second side hinge arm 132b, in this example, has a hollow cylindrical shape. Moreover, as depicted, the module housing 50 is projected toward the salience Zc axis. In the case of a folder type mobile phone, the hinge Z axis is the salience axis Zc.

The module housing 50 embeds a camera module 60. The camera module 60 includes an image pick-up device (not shown), such as a CCD, and a lens 66. An image signal that is converted through the lens 66 and an image pick-up device can be transferred to the main board of mobile phone 125 via the flexible circuit board (FCB) 75 that electrically connects the camera module 60 and the main board of mobile phone 125. In this regard, a through-hole 115 is formed on the main body of mobile phone 110 so that the flexible circuit board 75 can pass through the module housing 50 to connect the main board of mobile phone 125.

The module housing 50 can be projected from and stored in the main body 110. In the case of a folder type mobile phone, the main body 110 is the hinge unit 131 as described above.

When the module housing 50 is stored in the main body 110, a part of the module housing 50 cannot be projected on the outside of the main body 110. Because the module housing 50 can be rotated after being projected on the outside of the main body 110, a rotation protecting means that is projected on the outside of the main body 110 is not required to rotate the module housing while being stored in the main body 110.

The flexible circuit board 75 can be any length suitable for both storing the module housing 50 in the main body 110 (or, more particularly, the hinge unit 131) and for projecting the module housing 50 outside of the main body 110. In particular, when the module housing 50 is projected from the main body 110, the length of distance from the camera module 60 to the main board 125 becomes longer than when the module housing 50 is stored in the main body 110. Accordingly, the flexible circuit board must be sufficiently long to maintain a stable electrical connection between the camera module 60 and the main board 125. Moreover, when the module housing 50 is rotated, the flexible circuit board 75 does not have to be twisted in the module housing 50.

In a preferred embodiment of the present invention, the embedded camera apparatus comprises a guide member 80 that prevents the flexible printed circuit board (FPCB) 75 from being twisted. The guide member 80, in this regard, includes a guide axis 85 which is projected inside the module housing 50, and which guides the FPCB, such that the FPCB is arranged along the guide axis. In other words, when the module housing 50 is projected from or stored in the case 11, the flexible printed circuit board 75 is formed along the guide axis 85.

The module housing 50 can include a module storage unit 51 and a salience insertion unit 52. Preferably, the salience insertion unit 52, in this regard, has a hollow cylindrical shape and is insertable into and projectable from the main body 110.

The guide member 80 also preferably comprises a combination plate 82 having a disc shape and a guide axis 85 which is perpendicularly centered to the combination plate and which is shaped such that it projects into the salience insertion unit 52. The combination plate 82, in this regard, is preferably connected to the main body 110 along the Zc protrusion axis of the camera module 60. In other words, the combination plate 82 can be fixed along the Zc salience axis, as well as being rotable in a perpendicular manner with respect to the Zc salience axis.

As shown in FIG. 3, the flexible printed circuit board (FPCB) 75 can form an S-shape along (i.e., adjacent to) one side 85' of the guide axis 85 inside the salience insertion unit 52, thereby preventing the flexible printed circuit board from being twisted.

The flexible circuit board 75 can include a module side part 75a, a main board side part 75c, and a connection part 75b. Preferably, the module side 75a is connected to one end of the camera module 60 and is adjacent to one side 85' of the guide axis. The main board side part 75c is preferably connected at one end to the main board 125 and is adjacent to the other side 85" of the guide axis. The connection part 75b preferably connects the module side part 75a and the main board side part 75c and is adjacent to the side 85' of the guide axis and adjacent to the module side unit. In other words, the module side part 75a, the main board side part 75c, and the connection part 75b can collectively form an S-shape.

In this regard, as shown in FIG. 6, the combination plate 82 can include an insertion groove 82h into which the main board side part 75c is inserted. Moreover, the flexible circuit board 75 between the module housing 50 and the main board 125 can be any suitable shape and length. Preferably, the flexible circuit board 75 has a suitable shape and length to avoid those excessive forces that are inflicted on a terminal connecting to the main board 125, for example, when the module housing 50 is projected from or inserted in the main body 110 and the flexible printed circuit board 75 placed outside the module housing 50 moves, which otherwise would result the absence of a smooth connection between the flexible circuit board 75 and the main board 125. In order to prevent such disconnection, the main board side part 75c, for example, can be inserted into the insertion groove 82h to be substantially fixed thereto, such that the electrical connection between the flexible circuit board 75 and the main board 125 is stable.

Any suitable mechanism can be employed to prevent the flexible circuit board 75 from twisting. For example, the module housing 50 can be capable of rotating in the same manner as the guide member 80 (discussed above). Additionally, the camera module 60 can be rotatably formed. Moreover, the guide axis 85 can be rotated in the same manner as the camera module 60, in order to prevent the flexible circuit board 80 from being twisted.

In another preferred embodiment of the present invention, the combination plate comprises a board placement unit 87 to prevent the flexible circuit board 75 from twisting and to ensure a stable electrical connection between the flexible circuit board 75 and the external main board 25, wherein the board placement unit 87 projects in a direction opposite of the salience insertion unit, which makes at least a part of the main board side part 75c placed, and which protrudes from the combination plate 82. In this regard, the insertion groove 82h preferably is substantially parallel or parallel with the guide axis 85, and the board placement unit 87 is substantially adjacent in location to insertion groove 82h.

The combination plate 82 is preferably fixed to the case adjacent to the salience Z axis, and is not fixed adjacent to the perpendicular direction of the salience axis, so as to make its rotation possible. Moreover, it is preferable for one or more insertion holes 83 to be formed at the combination plate 82, and a salience unit 53, which is inserted in the insertion hole 83, to be formed at an end of the salience insertion unit 52 which confronts the insertion hole 83, such that the salience unit 53 is inserted in the insertion hole 83.

The module housing 50 can be projected from or inserted into the case 11, for example, by pressure applied by a user. To be more specific, a salience 58 is formed on the circumferential surface of the salience insertion unit 52 of the module housing 50, and the salience 58 is inserted into a salience guide groove 18 on the inside surface of the case 11 that confronts the salience, and which guides forward and backward movement of the salience 58. Accordingly, when a user pulls or pushes the module storage unit 51 of the module housing toward the salience axis Zc, the salience 58 moves back and forth along the salience guide groove 18 to make the module housing project from or insert into the case 11.

The module housing of the mobile phone can be stored without being projected from the main body of mobile phone, and is projectable from the main body of mobile phone when a user wants to use the camera. Accordingly, the mobile phone can be made to be flat, can be stored in a variety of square-type mobile phone storage means, and can have a good appearance. When the camera module is projected from or inserted in the main body of mobile phone, the flexible circuit board can electrically connect the camera module and the main board of mobile phone stably without being twisted.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An embedded camera apparatus, comprising:
a module housing which embeds a camera module comprising an image pick-up device and a lens, wherein the module housing is stored in a case, such that at least a part of the module housing is projectable from the case;
a flexible circuit board that electrically connects the camera module and an external main board; and
a guide member which is formed in the case, comprising a combination plate and a guide which projects inside the module housing and which guides the flexible circuit board, such that the flexible circuit board is arranged along two opposing sides of a single projection of the guide.

2. The apparatus of claim 1, wherein:
the module housing comprises a module storage unit which stores the camera module, and a salience insertion unit which has a hollow cylinder shape and which is insertable into the case and projectable from the case; and
the combination plate is connected to the case along a salience axis of the camera module.

3. The apparatus of claim 2, wherein the guide is projectable into the salience insertion unit from the combination plate, and wherein the flexible circuit board forms an S-shape adjacent to one side of the guide in the salience insertion unit.

4. The apparatus of claim 2, wherein the combination plate comprises an insertion groove into which the main board side part is inserted.

5. The apparatus of claim 2, wherein the salience insertion unit comprises one or more salience units at a portion of the salience insertion unit which confronts the combination plate, and wherein the combination plate comprises an insertion hole into which the one or more salience units are insertable, such that the one or more salience units are moveable back and forth and rotatable with the insertion hole when inserted in the insertion hole.

6. The apparatus of claim 2, wherein the salience insertion unit comprises a salience on the circumferential surface of the salience insertion unit, and wherein the case comprises a salience guide groove on the inside surface of the case confronting the salience which guides forward and backward movement of the salience.

7. An embedded camera apparatus, comprising:
a module housing which embeds a camera module comprising an image pick-up device and a lens, wherein the module housing is stored in a case, such that at least a part of the module housing is projectable from the case;
a flexible circuit board that electrically connects the camera module and an external main board; and
a guide member which is formed in the case, comprising a combination plate and a guide which projects inside the module housing from a center of the plate and which guides the flexible circuit board, such that the flexible circuit board is arranged along the guide;
wherein:
the module housing comprises a module storage unit which stores the camera module, and a salience insertion unit which has a hollow cylinder shape and which is insertable into the case and projectable from the case;
the combination plate is connected to the case along a salience axis of the camera module; and
the flexible circuit board comprises:
a module side part which is connected to one end of the camera module, and which is adjacent to one side of the guide;
a main board side part which is connected at one end to the external main board and which is adjacent to the opposing side of the guide; and
a connection part which connects the module side part and the main board side part, and which is adjacent to the module side part along one side of the guide.

8. The apparatus of claim 7, wherein the combination plate comprises a board placement unit which is projected in a direction opposite of the salience insertion unit and which situates at least a part of the main board side part.

9. The apparatus of claim 8, wherein the insertion groove is parallel with the guide, and wherein the board placement unit is substantially adjacent to the insertion groove.

10. A mobile phone comprising an embedded camera apparatus, comprising:
a main body comprising a main body case unit that embeds a main board;
a module housing that embeds a camera module comprising an image pick-up device and a lens, wherein the module housing is stored in the main body such that at least a part of the module housing is projectable from the case;
a flexible circuit board that electrically connects between the main board and the camera module; and
a guide member comprising a combination plate and a guide which projects inside the module housing, and which guides the flexible circuit board, such that the flexible circuit board is arranged along two opposing sides of a single projection of the guide.

11. The mobile phone of claim 10, wherein:
the module housing comprises a module storage unit which stores the camera module, and a salience insertion unit which has a hollow cylinder shape and which is insertable into the main body of mobile phone and projectable from the main body of mobile phone;
the combination plate is connected to the main body along a salience axis of the camera module; and
the guide is projectable into the salience insertion unit from the combination plate, and wherein the flexible circuit board forms a S-shape adjacent to one side of the guide in the salience insertion unit.

12. The mobile phone of claim 11, wherein the salience insertion unit comprises one or more salience units at that portion of the salience insertion unit which confronts the combination plate, and wherein the combination place comprises an insertion hole into which the one or more salience units are insertable, such that the one or more salience units are moveable back and forth and rotatable with the insertion hole while inserted in the insertion hole.

13. The mobile phone of claim 11, wherein the salience insertion unit comprises a salience on the circumferential surface of the salience insertion unit, and wherein the case comprises a salience guide groove on the inside surface of the case confronting the salience which guides forward and backward movement of the salience is formed.

14. The mobile phone of claim 10, wherein the main body further comprises a folder unit which is hinge-combined with the main body case unit which forms the module housing.

15. A mobile phone comprising an embedded camera apparatus, comprising:
a main body comprising a main body case unit that embeds a main board;
a module housing that embeds a camera module comprising an image pick-up device and a lens, wherein the module housing is stored in the main body such that at least a part of the module housing is projectable from the case;

a flexible circuit board that electrically connects between the main board and the camera module; and a guide member comprising a combination plate and a guide which projects inside the module housing from a center of the plate, and which guides the flexible circuit board, such that the flexible circuit board is arranged along the guide;

wherein:

the module housing comprises a module storage unit which stores the camera module, and a salience insertion unit which has a hollow cylinder shape and which is insertable into the main body of mobile phone and projectable from the main body of mobile phone;

the combination plate is connected to the main body along a salience axis of the camera module;

the guide is projectable into the salience insertion unit from the combination plate, and wherein the flexible circuit board forms a S-shape adjacent to one side of the guide in the salience insertion unit; and the flexible circuit board comprises:
- a module side part which is connected to one end of the camera module and which is adjacent to one side of the guide;
- a main board side part which is connected at one end to the main board of mobile phone and which is adjacent to the other side of the guide; and
- a connection part which connects the module side part and the main board side part, and which is adjacent to the module side part along one side of the guide.

16. The mobile phone of claim 15, wherein the combination plate comprises an insertion groove into which the main board side part is inserted.

17. The mobile phone of claim 16, wherein the combination plate comprises a board placement unit which is projected into a direction opposite of the salience insertion unit and which situates at least a part of the main board side part.

18. The mobile phone of claim 17, wherein the insertion groove is parallel with the guide, and wherein the board placement unit is substantially adjacent to the insertion groove.

19. An embedded camera apparatus, comprising:
a module housing which embeds a camera module comprising an image pick-up device and a lens, wherein the module housing is stored in a case, such that at least a part of the module housing is projectable from the case;

a flexible circuit board that electrically connects the camera module and an external main board; and a guide member which is formed in the case, comprising a combination plate and a guide which projects inside the module housing from a center of the plate and which guides the flexible circuit board and the flexible circuit board forms an S-shape around the guide such that a first portion of the flexible circuit board is adjacent to one side of the guide and a second portion of the flexible circuit board is adjacent to the opposing side of the guide.

20. An embedded camera apparatus, comprising:
a module housing which embeds a camera module comprising an image pick-up device and a lens, wherein the module housing is stored in a case, such that at least a part of the module housing is projectable from the case;

a flexible circuit board that electrically connects the camera module and an external main board; and a guide member which is formed in the case, comprising a combination plate and a guide which projects inside the module housing and which guides the flexible circuit board, such that the flexible circuit board is immediately abutting the guide for a portion along an axis that is perpendicular to a flat surface of the plate and passes through a central point of the plate.

* * * * *